United States Patent [19]

Hanson et al.

[11] Patent Number: 5,914,191

[45] Date of Patent: Jun. 22, 1999

[54] MULTILAYERED PACKAGING MATERIALS FOR ELECTROSTATIC APPLICATIONS

[75] Inventors: Scott Arnold Hanson, Kingsport, Tenn.; Hubertus Jacobus Wilhelmus Moolenaar, Dordrecht, Netherlands; Yvette Marie Feay; Harold Eugene Dobbs, both of Kingsport, Tenn.

[73] Assignee: Eastman Chemical Company, Kingsport, Tenn.

[21] Appl. No.: 08/840,365

[22] Filed: Apr. 29, 1997

Related U.S. Application Data

[60] Provisional application No. 60/017,055, May 3, 1996.

[51] Int. Cl.$^6$ ..................................................... B32B 27/00
[52] U.S. Cl. ........................... 428/409; 428/480; 428/483; 428/521; 428/522; 428/412; 428/423.7; 428/35.7; 428/35.9; 428/212; 428/213; 428/215; 428/334; 428/337
[58] Field of Search ............................. 428/411.1, 423.1, 428/423.7, 480, 482, 483, 212, 412, 500, 332, 35.7, 35.9, 213, 215, 337, 409, 521, 522

[56] References Cited

U.S. PATENT DOCUMENTS

| | | | |
|---|---|---|---|
| 4,719,263 | 1/1988 | Barnhouse et al. | 525/187 |
| 4,931,506 | 6/1990 | Yu | 525/187 |
| 5,101,139 | 3/1992 | Lechter | 315/85 |
| 5,159,053 | 10/1992 | Kolycheck et al. | 528/76 |
| 5,237,009 | 8/1993 | Lee | 525/187 |
| 5,342,889 | 8/1994 | Sullivan et al. | 525/127 |
| 5,476,612 | 12/1995 | Wessling et al. | 252/511 |
| 5,478,816 | 12/1995 | Kochem et al. | 428/35.2 |
| 5,631,311 | 5/1997 | Bergmann et al. | 523/333 |
| 5,643,991 | 7/1997 | Stipe et al. | 524/496 |

FOREIGN PATENT DOCUMENTS

| | | |
|---|---|---|
| 1 507 876 | 4/1978 | United Kingdom . |
| 91/10237 | 7/1991 | WIPO . |

OTHER PUBLICATIONS

Derwent Abstract WPI Accession No. 95–182620 (JP 7101016) (Apr. 18 1995).

Derwent Abstract WPI Accession No. 95–401133 (JP 7278398) (Nov. 24, 1995).

Derwent Abstract WPI Accession No. 95–221598 (JP 7135087) (May 23, 1995).

Harding, J. A. et al., "Static Dissipative Polymeric Antistatic Modified Thermoplastics," *SPE Antec Technical Papers*, 36, pp. 409–411(1990 ).

Lee, B. L., "Electrically Conductive Polymer Composites and Blends," *Polymer Engineering and Science*, 32, pp. 36–42 (1992).

Derwent Abstract WPI Accession No. 91–201573 (WO 91/10237; copy of corresponding U.S. Patent 5,476,612 also provided).

*Primary Examiner*—Marie Yamnitzky
*Attorney, Agent, or Firm*—Betty J. Boshears; Harry J. Gwinnell

[57] ABSTRACT

A multi-layer electrostatic dissipative structure that is clear to translucent, washable and thermo-formable comprises at least one outer layer and a core layer. Preferably, two outer layers are utilized with the core layer sandwiched therebetween. The outer layers are a blend of amorphous or semi-crystalline copolyester and an electrostatic dissipative polymer in an amount sufficient to impart a surface resistivity of about $10^5$ to $10^{12}$ Ohms/sq. The core layer is a polymer having a haze value of less than five percent, preferably amorphous or semi-crystalline copolyester. The multi-layer structure may additionally have tie layers between the core layer and each of the outer layers.

16 Claims, No Drawings

MULTILAYERED PACKAGING MATERIALS FOR ELECTROSTATIC APPLICATIONS

CROSS-REFERENCE TO RELATED APPLICATIONS

This application claims the benefit of U.S. Provisional Application No. 60/017,055 filed on May 3, 1996.

FIELD OF THE INVENTION

This invention relates to multi-layer extruded films or sheets and, more particularly, to those that are used to package static sensitive electronic components.

BACKGROUND OF THE INVENTION

Polyester materials are widely used as extrusion and injection molding resins for applications such as fibers, films, automotive arts, and food and beverage containers. Commonly used polyesters include poly(ethylene terephthalate) (PET), poly(1,4-butylene terephthalate) (PBT), poly(1,4-cyclohexylene-dimethylene terephthalate) (PCT), and poly(ethylene 2,6-naphthalenedicarboxylate) (PEN). These polyesters typically have good heat resistance and high glass transition temperatures.

For those applications in which extrusion and molding temperatures must be maintained below about 240° C., these highly crystallizable polyesters are not used because their melting points are too high. In such cases, amorphous or slowly crystallizable copolyesters are used since these materials may be processed at moderate temperatures.

For applications of packaging of static sensitive electronic components such as disk drive heads and integrated circuits, materials that are conductive or static dissipative and processible at moderate temperatures are required. The optimum fitness-for-use criteria for this market include electrostatic dissipation properties, dimensional stability, washability, thermoformability, acceptable slitting characteristics, peelable seal characteristics to cover tapes, and low migration levels of condensable materials from the package to the packaged components. An additional optimum criterion is transparency so that the component may be seen through the package. Since inherently dissipative polymers typically do not have the mechanical properties needed to form useful articles for packaging, they need to be blended with other polymers, such as amorphous or semi-crystalline copolyesters, to achieve useful properties.

WO 91/10237 discloses static dissipative compositions containing a non-conductive matrix polymer and at least two additives. In one of the examples a copolyester of poly (ethylene terephthalate) containing cyclohexanedimethanol and ethylene glycol is combined with polyaniline.

U.S. Pat. Nos. 4,719,263, 4,931,506, 5,101,139 and 5,237,009, all assigned to The B.F. Goodrich Company, disclose the use of ethylene oxide copolymers and epihalohydrin copolymers in imparting electrostatic dissipating properties to various polymers including thermoplastic polyesters.

U.S. Pat. Nos. 5,159,053 and 5,342,889 disclose electrostatic dissipating polymers based on polyurethanes derived from polyethylene glycol compositions including the commercial product known as Stat-Rite, available from The B.F. Goodrich Company. The polyurethanes may be blended with other base polymers as an electrostatic dissipative (EDS) agent.

Other sources of prior art on EDS materials include J. A. Harding et al, "Static Dissipative Polymeric Antistatic Modified Thermoplastics," SPE ANTEC Technical Papers, 36, 409 (1990) and Bing-Lin Lee, "Electrically Conductive Polymer Composites and Blends," Polymer Engineering and Science, 32, 36 (1992). The latter describes certain properties of an 80/20 PETG/polyether copolymer.

SUMMARY OF THE INVENTION

A multi-layer electrostatic dissipative structure comprises at least one outer layer and a core layer, preferably two outer layers with the core layer sandwiched therebetween. The outer layers are a blend of an amorphous or a semi-crystalline copolyester and an electrostatic dissipative polymer in an amount sufficient to impart a surface resistivity of about $10^5$ to $10^{12}$ Ohms/sq. The core layer is a polymer having a haze value of less than five percent and is preferably an amorphous or a semi-crystalline copolyester. The multi-layer structure may additionally have tie layers between the core layer and each of the outer layers.

DESCRIPTION OF THE INVENTION

This invention relates to a new class of clear to translucent, washable, thermoformable multi-layer structures for applications requiring a thermoplastic material that can dissipate an electrostatic charge. Many applications exist in which the multi-layer structure of the present invention may be used, i.e. packaging for static sensitive electronic components, clean room glazing and multi-wall sheets used as partitions, fabricated boxes and extruded profiles.

The multi-layer electrostatic dissipative structures comprise at least one outer layer and a core layer. The preferred multi-layer structures comprise three to five layers. The three-layer structure comprises two outer layers with the core layer sandwiched therebetween. The five layer structure in addition has two tie layers, one each between the core layer and each of the outer layers. Additional layers may also be added to the structure depending on the needs of the particular application.

The outer layers are blends of amorphous or semi crystalline copolyesters and electrostatic dissipative, i.e. conductive, polymers. The outer layers contain an amount of electrostatic dissipative polymer sufficient to impart a surface resistivity of about $10^5$ to $10^{12}$ ohms/square(sq), preferably $10^7$ to $10^{11}$ ohms/sq, before and after thermoforming. The surface resistivity is measured according to ASTM D-257.

Preferably, the electrostatic dissipative polymer is a polyetherurethane or polyaniline and present in the blend in an amount of about 3 to about 40 weight percent, based on the total weight of the blend. The preferred amount of the polyetherurethane in the outer layer, i.e. blend, is about 25 to about 35 weight percent. The preferred amount of polyaniline is about 3 to about 15 weight percent.

The amorphous or semi-crystalline copolyester provides the necessary mechanical and chemical properties desired for the multi-layer structure. The preferred copolyesters are those containing a sufficient amount of dibasic acids or glycol modifier to have a melting point of less than 240° C. Useful dibasic acid modifiers include aliphatic dibasic acids containing 4 to about 40 carbon atoms, cycloaliphatic dibasic acids such as 1,4-cyclohexane-dicarboxylic acid, and aromatic acids such as naphthalenedicarboxylic acid, isophthalic acid and the like. Useful glycol modifiers include those containing 3 to about 10 carbon atoms such as propylene glycol, 1,3-propanediol, 1,4-butanediol, 1,6-hexanediol, 1,4-cyclohexanedimethanol, neopentyl glycol, 2,2,4,4-tetramethyl-1,3-cyclobutanediol and the like. Poly (ethylene 2,6-naphthalenedicarboxylate) copolymers (PEN copolyesters) and poly(ethylene 1,4-cyclohexanedicarboxylate) copolyesters (PECD copolyesters) are also operable. The inherent viscosity (I.V.) of these copolyesters is generally in the range of about 0.5 to about 1.5.

The core layer is a polymer having a haze value of less than five percent as measured according to ASTM D1003. Examples of such polymers include amorphous or semi-crystalline copolyesters, poly(methyl methacrylate) (PMMA), polystyrene, poly (vinyl chloride), polycarbonates and the like. Preferably, the core layer is one or more of the above-defined amorphous or semi-crystalline copolyesters used in the outer layer. Regrind from previous extrusion or thermoforming operations may be added to the core layer.

For comparison, other materials were utilized in the outer layers. When the core layer and the matrix polymer in the outer layers is PMMA, the multi-layer structures are brittle. When using unmodified PET polyester with polyurethane, the processing temperatures that are required (280° C. to 300° C.) result in too great of a mismatch of viscosities between the materials making processing extremely difficult. When using unmodified PET polyester with polyaniline, the high processing temperature required for the polyester causes the polyaniline to become thermally unstable, and no electrical conductivity is achieved.

The tie layers serve as a compatibilizer to improve adhesion between the outer layer and core layer. The tie layers are preferably a polyester elastomer or a styrene copolymer. Examples of the polyester elastomer include Ecdel® elastomer 9965, Ecdel® elastomer 9966, or Ecdel elastomer 9967, all available from Eastman Chemical Company of Kingsport, Tenn. Some typical styrene copolymers include acrylonitrile-butadiene-styrene (ABS) resin and styrene-butadiene or styrene-isoprene block polymers such as K-RESIN® available from Phillips Petroleum Company, STRYOLUX® 693D available from BASF AG of Germany, and KRATON® FG 1901X available from Shell Chemical Company of Houston, Tex.

In the multi-layer structures, the overall thickness of the multi-layer structure is about 0.2 mm to about 6 mm (about 8 to about 250 mils), preferably 0.2 mm to 1.25 mm (8 to 50 mils) for packaging applications. The thickness of the outer layers is about 0.0125 mm to about 0.5 mm (about 0.5 to about 20 mils), preferably 0.0125 mm to 0.25 mm (0.5 to 10 mils) for packaging applications. Tie layers will have a thickness of about 0.0125 mm to 0.25 mm (about 0.5 to 10 mils), preferably 0.025 mm to 0.125 mm (1 to 5 mils).

The multi-layer structures are made using conventional laminating techniques such as coextrusion, in-line or off-line lamination and extrusion coating. When converting the multi-layer structures into end products via thermoforming, draw ratios of about 1.1:1 to about 4:1 are used and temperatures of about 120° C. to about 180° C. are used.

The multi-layer structures provide advantages over the prior art monolayer structures. The use of the thin outer layer provides a static dissipative capping layer that is substantially translucent as compared to prior art static dissipative materials of increased thickness. The combination of the outer layer and transparent core layer provide an overall multi-layer structure that has sufficient clarity for viewing a component in a container made from the multi-layer structure. The multi-layer structures are more economical than monolayer structures since they use less electrostatic dissipative polymer, have better retention of physical properties due to the increased amount of amorphous or semi-crystalline copolyester, and exhibit lower outgassing.

EXAMPLES

The following examples will further illustrate the invention.

Example 1

A poly(ethyleneterephthalate) (PET) copolyester containing 31 mole % 1,4-cyclohexanedimethanol (I.V. of 0.74) is mixed with 25 weight % Stat-Rite® C-2300 Polyetherurethane (available from B.F. Goodrich Company of Cleveland, Ohio) and dried. This mixture is compounded at less than 245° C. in a Werner Pfleiderer ZSK-30 twin screw extruder, extruded through a rod die and chopped into 3 mm (⅛ inch) pellets. The pellets are dried and formed into a melt. The melt is coextruded with unblended PET copolyester through a Dow type feedblock and coathanger die to provide a multilayer structure containing three layers. The two outer layers are the PET copolyester/polyetherurethane blend at 0.075 mm (3-mil) thickness each. The core layer is the unblended PET copolyester at 0.6 mm (24-mil) thickness. The extrusion temperature of the melt is between 200° C. and 225° C.

The 0.75 mm (30-mil) thick multi-layer structure is thermoformed at a sheet temperature of 150° C. to provide clamshell containers having 0.5 mm (20-mil) average thickness. These containers have good clarity, toughness, and static dissipative properties. These containers may be washed without deleteriously affecting the good surface resistivity properties of the package.

Similarly good results are achieved when the outer layers contain 20 weight % or 40 weight % polyetherurethane. Similarly good results are also achieved when regrind is used in the core layer.

These clamshell containers are useful to store sensitive electronic devices such as disk drive heads, integrated circuit chips, and the like.

Example 2

Using the procedure of Example 1, poly (1,4-cyclohexylenedimethylene terephthalate) (PCT) copolyester containing 48 mole % 1,4-cyclohexanedicarboxylate (I.V. 0.72) is melt blended with 28 weight % polyether-urethane at less than 245° C. This blend is coextruded as in Example 1 with the unblended PCT copolyester using melt temperatures of 225° C. to provide a multi-layer structure containing two outer layers [0.1 mm (4-mil) thick] of the PCT copolyester/polyetherurethane blend and a core layer of unblended PCT copolyester [0.55 mm (22-mil) thick].

The multi-layer structure is thermoformed at a sheet temperature of 150° C. to provide trays with 0.5 mm (20 mil) average thickness. These trays have good clarity, toughness and static dissipative properties. The trays may be washed without deleteriously affecting the good surface resistivity properties of the package.

Similarly good results are achieved when the core layer is the PET copolyester of Example 1 or a PET copolyester containing 37 mole % of diethylene glycol (I.V. 0.74).

Example 3

The procedure of Example 1 is repeated except that poly(methyl methacrylate) (PMMA) is used instead of the PET copolyester for the core layer and as the matrix polymer in the outer layers. The multi-layer structure has outer layers containing 25 weight % polyetherurethane/75 weight % PMMA and a core layer containing only PMMA. Thermoformed trays from this multi-layer structure are brittle and, thus, unusable for most applications.

Example 4

Following the general procedure of Example 1, a five layer coextruded multi-layer structure is prepared. The outer layers are 0.075 mm (3-mil) thick PET copolyester containing 25 weight % polyetherurethane. The tie layers are 0.05 mm (2-mil) thick Ecdel® Polyester Elastomer 9966 (melt flow rate of 10 g/10 min at 230° C. as measured by ASTM method D 1238). The core layer is 0.55 mm (22-mil) thick PMMA. This multi-layer structure is thermoformed at 150° C. to provide trays having good appearance and electrostatic properties. Similarly good results are achieved when polystyrene is substituted as the core layer.

Example 5

Poly(ethylene terephthalate) copolyester containing 31 mole % 1,4-cyclohexanedimethanol (I.V. of 0.74) is mixed with 5 weight % polyaniline (available from Neste Oy of Finland) and dried. This mixture is compounded at less than 245° C. in a Werner Pfleiderer ZSK-30 twin screw extruder, extruded through a rod die and chopped into 3 mm (⅛ inch) pellets. The pellets are dried and formed into a melt. The melt is coextruded with the unblended PET copolyester through a coathanger die as in Example 1 to provide a multi-layer structure containing three layers. The two outer layers are the PET copolyester/polyaniline blend, each at 0.075 mm (3-mil) thickness. The core layer is the unblended PET copolyester at 0.6 mm (24-mil) thickness. The extrusion temperature of the melt is between 200° C. and 225° C.

The 0.75 mm (30-mil) thick multi-layer structure is thermoformed at 150° C. to provide clamshell containers having 0.5 mm (20 mil) thickness. These containers have good clarity, toughness, and static dissipative properties. These containers may be washed without deleteriously affecting the good surface resistivity properties of the package.

Similarly good results are achieved when the outer layers contain 3 weight % or 12 weight % polyaniline. Similarly good results are also achieved when regrind is used in the core layer.

Example 6

Using the procedure of Example 5, PCT copolyester (I.V. 0.72) is melt blended with 4 weight % polyaniline at less than 245° C. This blend is coextruded as in Example 1 with unblended PCT copolyester using melt temperatures of 225° C. to provide the multi-layer structure. The outer layers [0.1 mm (4-mil) thick] are PCT copolyester/polyaniline blend and the core layer is unblended PCT copolyester [0.55 mm (22-mil) thick].

The multi-layer structure is thermoformed at 150° C. to provide trays with 0.25 mm (10 mil) thickness. These trays have good clarity, toughness and static dissipative properties. The trays may be washed without deleteriously affecting the good surface resistivity properties of the package.

Similarly good results are achieved when the core layer is the PET copolyester of Example 1 or a PET copolyester containing 37 mole % of diethylene glycol (I.V. 0.74).

Example 7

The procedure of Example 5 is repeated except that poly(methyl methacrylate) is used instead of the PET copolyester for the core layer and as the matrix polymer in the outer layers. The multi-layer structure is prepared in which the outer layers contain 5 weight % polyaniline/95 weight % PMMA and the core layer contains PMMA. Thermoformed trays from this multi-layer structure are brittle and, thus, unusable for most applications.

Example 8

Following the general procedure of Example 1, a five layer coextruded multi-layer structure is prepared. The outer layers are 0.075 mm (3-mil) thick PET copolyester containing 5 weight % polyaniline. The tie layers are 0.05 mm (2-mil) thick Ecdel® Polyester Elastomer 9966 (melt flow rate of 10 g/10 min at 230° C. as measured by ASTM method D 1238). The core layer is 0.55 mm (22-mil) thick PMMA. This multi-layer structure is thermoformed at 150° C. to provide trays having good appearance and electrostatic properties.

Similarly good results are achieved when polystyrene is substituted as the core layer.

This invention has been described in detail with particular reference to preferred embodiments thereof, but it will be understood that variations and modifications can be effected within the spirit and scope of the invention.

What is claimed is:

1. A multi-layer electrostatic dissipative structure comprising at least one outer layer adjacent a core layer, said outer layer comprising a blend of an amorphous or a semi-crystalline copolyester and an electrostatic dissipative polymer in an amount sufficient to impart a surface resistivity of about $10^5$ to $10^{12}$ Ohms/sq, and said core layer comprising a polymer having a haze value of less than five percent.

2. The multi-layer electrostatic dissipative structure of claim 1 having a thickness of about 0.2 mm to about 6 mm (about 8 to about 250 mils) and wherein said outer layer has a thickness of about 0.0125 mm to 0.5 mm (0.5 to 20 mils).

3. The multi-layer electrostatic dissipative structure of claim 2 having a thickness of about 0.2 mm to about 1.25 mm (about 8 to about 50 mils) and wherein said outer layer has a thickness of about 0.0125 mm to 0.25 mm (0.5 to 10 mils).

4. The multi-layer electrostatic dissipative structure of claim 1 further comprising a second outer layer with said core layer sandwiched between said outer layers.

5. The multi-layer electrostatic dissipative structure of claim 4 further comprising two tie layers with each one of said tie layers between said core layer and each of said outer layers.

6. The multi-layer electrostatic dissipative structure of claim 5 having a thickness of about 0.2 mm to about 6 mm (about 8 to about 250 mils) wherein said outer layers have a thickness of about 0.0125 to 0.5 mm (about 0.5 to 20 mils) and said tie layers have a thickness of about 0.0125 to 0.25 mm (about 0.5 to 10 mils).

7. The multi-layer electrostatic dissipative structure of claim 6 having a thickness of about 0.2 mm to about 1.25 mm (about 8 to about 50 mils and wherein said outer layers have a thickness of 0.0125 to 0.25 mm (0.5 to 10 mils) and said tie layers have a thickness of about 0.025 to 0.125 mm (about 1 to 5 mils).

8. The multi-layer electrostatic dissipative structure of claim 5 wherein said tie layer comprises a polyester elastomer or a styrene copolymer.

9. The multi-layer electrostatic dissipative structure of claim 8 wherein said styrene copolymer is an acrylonitrile-butadiene-styrene resin, a styrenebutadiene block polymer, or a styrene-isoprene block polymer.

10. The multi-layer electrostatic dissipative structure of claim 1 wherein said amorphous or semi-crystalline copolyester is selected from the group consisting of a poly(ethylene terephthalate) copolyester containing a sufficient amount of dibasic acid or glycol modifier to have a melting point of less than 240° C., a poly(ethylene 2,6-naphthalenedicarboxylate) copolyester and a poly(ethylene 1,4-cyclohexanedicarboxylate) copolyester.

11. The multi-layer electrostatic dissipative structure of claim 10 wherein said dibasic acid modifier is selected from the group consisting of an aliphatic dibasic acid containing 4 to about 40 carbon atoms, a cycloaliphatic dibasic acid and an aromatic dibasic acid.

12. The multi-layer electrostatic dissipative structure of claim 10 wherein said glycol modifier is selected from the group consisting of a glycol containing 3 to about 10 carbon atoms, propylene glycol, 1,3-propanediol, 1,4-butanediol, 1,6-hexanediol, 1,4-cyclohexanedimethanol, neopentyl glycol, and 2,2,4,4-tetramethyl-1,3cyclobutanediol.

13. The multi-layer electrostatic dissipative structure of claim 1 wherein said electrostatic dissipative polymer is a polyetherurethane or a polyaniline.

14. The multi-layer electrostatic dissipative structure of claim 1 wherein said amount of said electrostatic dissipative polymer is sufficient to impart a surface resistivity of $10^7$ to $10^{11}$ Ohms/sq.

15. The multi-layer electrostatic dissipative structure of claim 1 wherein said polymer of said core layer is selected from the group consisting of amorphous or semi-crystalline copolyester, poly(methyl methacrylate), polystyrene, poly(vinyl chloride), and polycarbonates.

16. The multi-layer electrostatic dissipative structure of claim 15 wherein said amorphous or semi-crystalline copolyester of said core layer is selected from the group consisting of a poly(ethylene terephthalate) copolyester containing a sufficient amount of dibasic acid or glycol modifier to have a melting point of less than 240° C., a poly(ethylene 2,6-naphthalenedicarboxylate) copolyester and a poly(ethylene 1,4-cyclohexanedicarboxylate) copolyester.

* * * * *

UNITED STATES PATENT AND TRADEMARK OFFICE
CERTIFICATE OF CORRECTION

PATENT NO. : 5,914,191
DATED : June 22, 1999
INVENTOR(S) : Scott Arnold Hanson et al It is certified that error appears in the above-identified patent and that said Letters Patent is hereby corrected as shown below:

On the title page in Section [56] by deleting "Betty J. Boshears" and replacing with - - -Cheryl J. Tubach- - -. Harry J. Gwinnell's name should remain.

Column 7, line 17, (Claim 12) please replace "2,2,4,4-tetramethyl-1,3cyclobutanediol" with - - -2,2,4,4-tetramethyl-1,3-cyclobutanediol- - -.

Signed and Sealed this

Fourteenth Day of December, 1999

Attest:

Q. TODD DICKINSON

Attesting Officer

Acting Commissioner of Patents and Trademarks